United States Patent [19]

Kitaura et al.

[11] Patent Number: 5,008,753
[45] Date of Patent: Apr. 16, 1991

[54] CLAMP SYSTEM USED FOR TELEVISION SIGNAL

[75] Inventors: Hiromu Kitaura, Osakasayama; Mitsuo Isobe, Osaka; Isao Kawahara, Hirakata; Yoshio Hirauchi, Osaka; Yuichi Ninomiya; Yoshimichi Ohtsuka, both of Kawasaki; Yoshinori Izumi, Tokyo, all of Japan

[73] Assignees: Matsushita Electric Industrial Co., Osaka; Nippon Hoso Kyokai, Tokyo, both of Japan

[21] Appl. No.: 314,090

[22] Filed: Feb. 23, 1989

[51] Int. Cl.[5] .............................................. H04N 5/18
[52] U.S. Cl. .................................... 358/171; 358/172
[58] Field of Search .................. 358/171, 172, 34, 173

[56] References Cited

U.S. PATENT DOCUMENTS

| 4,516,042 | 5/1985 | Nakomura | 358/172 |
| 4,544,951 | 10/1985 | Yoshisoto | 358/172 |
| 4,583,121 | 4/1986 | Yost | 358/173 |
| 4,612,577 | 9/1986 | Keen | 358/172 |
| 4,651,213 | 3/1987 | Takimoto | 358/171 |
| 4,688,097 | 8/1987 | Lin | 358/171 |
| 4,748,497 | 5/1988 | Sengoku | 358/24 |
| 4,816,917 | 3/1989 | Yamomoto et al. | 358/172 |
| 4,853,782 | 8/1989 | Asano et al. | 358/172 |

FOREIGN PATENT DOCUMENTS 6086994 5/1985 Japan .
0164768 7/1988 Japan .

Primary Examiner—Tommy P. Chin
Assistant Examiner—James Tuo
Attorney, Agent, or Firm—Stevens, Davis, Miller & Mosher

[57] ABSTRACT

A clamp system for television signal comprises a first clamp device for clamping to a clamp control voltage supplied from an external source by a horizontal clamp pulse and a second clamp device for controlling the DC potential of the television signal by adding the externally-supplied control voltage to an input television signal. The first clamp device is used during the period requiring an early clamp start, and the second clamp device is operated under normal conditions.

7 Claims, 4 Drawing Sheets

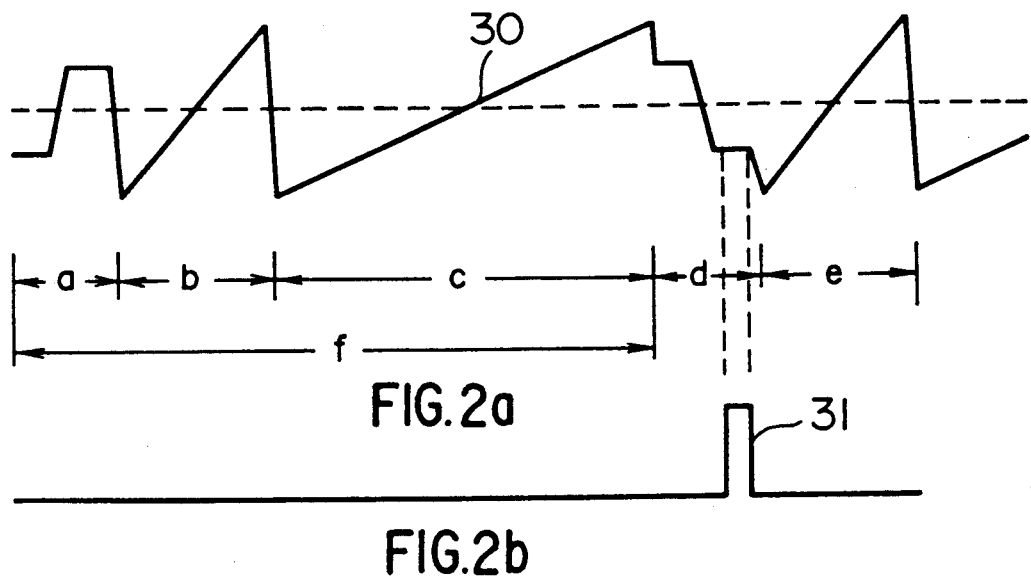
FIG.2a
FIG.2b
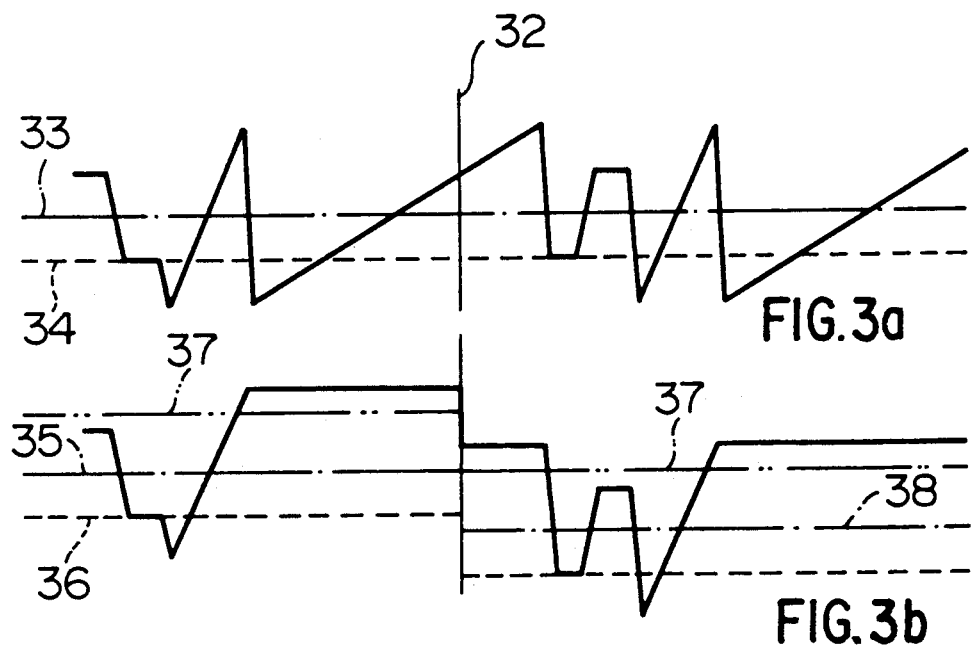
FIG.3a
FIG.3b

CLAMP SYSTEM USED FOR TELEVISION SIGNAL

BACKGROUND OF THE INVENTION

1. FIELD OF THE INVENTION

The present invention relates to a signal clamp system for a television receiver.

2. DESCRIPTION OF THE RELATED ART

A band compression transmission system called "MUSE" has been suggested by JP-A-60-86994 in which a video signal for High Vision (high-definition television system) for producing an image more detailed than the existing standard television systems is transmitted by one channel of 27 MHz bandwidth from a broadcasting satellite. For this television signal, a positive synchronization for including a sync signal within a video signal amplitude is employed to maximize the signal-to-noise (S/N) ratio. This prevents the use of a conventional method in which horizontal and vertical sync signals are separated from the television signal and the sync signals thus separated are used to drive a sync circuit of the television receiver. As a result, in the MUSE system mentioned above, for example, a vertical sync signal having a special form is inserted in the vertical flyback period and this signal is extracted by use of the correlationship between scanning lines, after which the horizontal sync signal is extracted thereby to attain the phase synchronization between an input television signal and a sync oscillation circuit.

This television signal, on the other hand, is comprised of a color difference signal compressed along the time axis and superimposed during the horizontal flyback period of the luminance signal and therefore has an extremely short pedestal period for clamp operation. Restoration of a band-compressed television signal requires a digital signal processing, which in turn makes it necessary to fix a DC potential in analog-digital conversion (hereinafter called A/D conversion) of the television signal. A clamp device is indispensable in fixing the DC potential. The horizontal clamp period of the television signal is so narrow that a signal with a very low S/N would be clamped at the formed end of a noise with the result that the noise would often cause the DC potential of the video signal to fluctuate. A vertical clamp system permitting a longer clamp period would be a solution to this problem. The vertical clamp, however, has a longer time constant for clamp and is often unable to compensate for sharp potential fluctuations of the television signal. While this may not pose any problem in the case of satellite broadcasting, it may pose problems in the case of a television signal processed through a video switcher and the like or a signal passed through recording or reproduction apparatus, for example, where sharp potential fluctuations are a particular problem. Further, in view of the fact that sync signals cannot be separated independently as described above, the sync detection of the receiver is effected first without clamp and a clamp is required to be effected immediately after sync pull-in, thus requiring a high-speed clamp at this moment.

As explained above, in a receiver of the television transmission system under consideration, a horizontal clamp which may be effected at high speed is liable to be fluctuated owing to noises at the time of deterioration of S/N, while as to the vertical clamp free of such a trouble but whose time constant cannot be shortened, it takes a considerable length of time before the rise immediately after power is thrown in or channel switching or clamp pull-in at the time of signal switching of a signal source other than for receiving a satellite broadcasting with a video switcher or the like. A most suitable clamp system has therefore been desired.

SUMMARY OF THE INVENTION

In view of the aforementioned facts, the object of the present invention is to provide a most suitable clamp system.

According to the present invention, there is provided a clamp system comprising first clamp means for clamping to a clamp control voltage applied from an external source by a horizontal clamp pulse, second clamp means for controlling the DC potential of television signal by adding a control voltage applied from an external source to an input television signal, and clamp level detection means for detecting a DC potential of a reference potential signal period during the television signal clamped thereby to generate a control signal for the first and second clamp means, wherein the first and second clamp means are switched to each other as required.

According to one aspect of the present invention, a horizontal clamp provided by the first clamp means is used during a period when a rapid clamp pull-in is required such as at the time of power throw-in or channel switching, while under normal conditions, the second clamp means is used to assure an always optimum clamp method. According to another aspect of the invention, there is provided compensation means for smoothing the transient response at the time of switching between the first and second clamp means, and dispersal removal is effected by use of the second clamp means.

BRIEF DESCRIPTION OF THE DRAWINGS

FIG. 2 shows a waveform designating positions of a television signal and a horizontal clamp pulse in the MUSE system.

FIG. 3 shows waveforms for explaining the relationship between the clamp potential of the television signal shown in FIG. 3 and APL.

DESCRIPTION OF THE PREFERRED EMBODIMENTS

Figure 1:
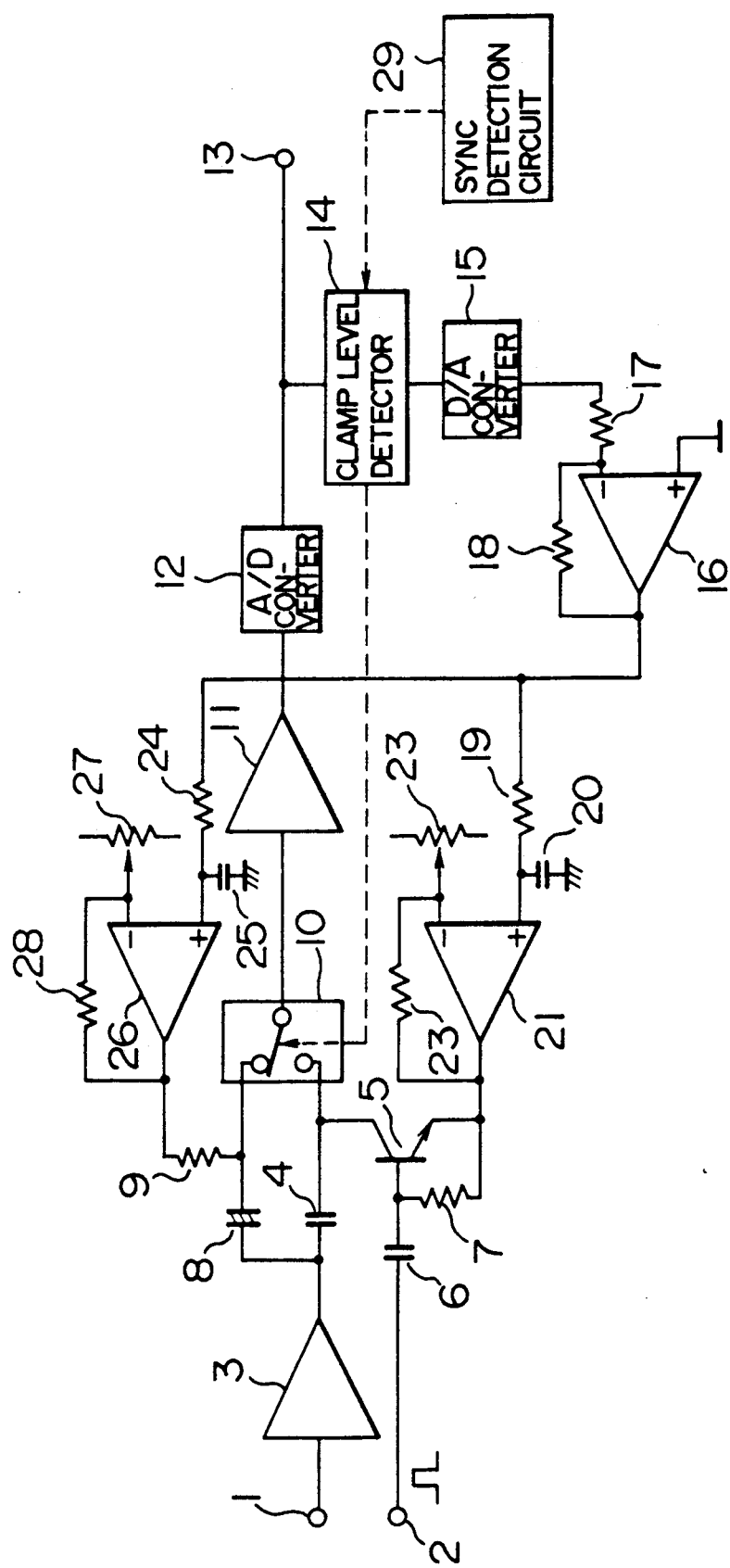
FIG. 1 is a circuit diagram of a television signal clamp apparatus according to a first embodiment of the present invention.

A basic configuration of the present invention will be explained with reference to a first embodiment thereof shown in FIG. 1. Reference numeral 1 designates a television signal input terminal, and numeral 2 a horizontal clamp pulse input terminal. The television signal of MUSE system has, as shown by 30 in FIG. 2, a horizontal sync signal period a, a time-compressed color difference signal period b, a luminance signal period c, a horizontal sync signal period for the next line d, a color difference signal period for the next line e, and one horizontal scanning period (hereinafter referred to as "1H") f. As will be seen from this diagram, the horizontal sync signal period of this signal has the feature that the polarity thereof is reversed every 1H. As a result, the clamp pulse is positioned at the trailing edge of a horizontal sync signal shown at the rate of one every other 1H that is once every 2H as indicated by 31 in the diagram.

In FIG. 1, numeral 3 designates a buffer amplifier having a low-output impedance, numeral 4 a capacitor for holding a clamp voltage, numeral 5 a transistor adapted to conduct with the above-mentioned clamp pulse, numeral 6 a DC cut capacitor, and numeral 7 a base bias resistor. The devices from the capacitor 4 to the resistor 7 constitute a first clamp circuit. Numeral 8 designates a DC cut capacitor, and numeral 9 a bias resistor. The capacitor 8 and the resistor 9 make up a second clamp circuit. Numeral 10 designates a switch for selecting an output of the first and second clamp circuits, numeral 11 a buffer amplifier having a high-input impedance, numeral 12 an A/D converter, numeral 13 a signal output terminal digitally converted, and numeral 14 a clamp level detection circuit for detecting a DC potential during a reference potential signal period existing in the vertical flyback period, for example, which is a signal of 50% level during about 1H for the television signal of MUSE system. By digitally differentiating this period, the DC potential of a television signal subjected to A/D conversion is detected digitally as an amount of deviation from a central value of a dynamic range exactly, so that a voltage corresponding to the amount of deviation is produced as a digital signal. Numeral 15 designates a digital-analog converter (hereinafter referred to as "D/A converter") for converting a digital output signal of the clamp level detection circuit into an analog voltage, numeral 16 an operational amplifier for inverted amplification of an output of the D/A converter, numeral 17 an input resistor, and numeral 18 a feedback resistor. An output of the amplifier provides a clamp control voltage. Numerals 19 and 20 designate a resistor and a capacitor respectively for setting a time constant of response of the first clamp circuit, numeral 21 an operational amplifier, and numeral 22 a variable resistor for providing an offset to the control voltage of the first clamp circuit. This offset is provided in order to compensate for the deviation of the potential during the clamp period of the first clamp circuit from the 50% level as obvious from FIG. 2 in view of the fact that the potential of the reference potential signal period detected by the clamp level detection circuit 14 is set to 50% as explained above. Numeral 23 designates a feedback resistor. Numerals 24 and 25 designate a resistor and a capacitor respectively for setting a time constant of the second clamp circuit, numeral 26 an operational amplifier, and numeral 27 variable resistors for providing an offset to the control voltage of the second clamp circuit. This offset, which is not basically required, is used for fine adjustment to minimize the transient response at the time of switching the clamp circuit outputs by the switch 10. Numeral 28 designates a feedback resistor. Numeral 29 designates a sync detection circuit for generating a signal for deciding whether a pull-in prevails or not and supplying the same signal to the clamp level detection circuit 14. If in a pull-out state, the clamp level detection circuit 14 forcibly set the output data to the value of 50% digitally regardless of the detection voltage, while at the same time connecting the switch 10 to the second clamp circuit. Incidentally, it is when the clamp level detection output deviates from the central value in either direction by more than a predetermined amount in a pull-in state that the change-over switch 10 is connected to the first clamp circuit.

In this configuration, a signal is clamped always by the second clamp circuit under steady state, and therefore the time constant of clamp can be set to a considerably long value. As a result, even if the S/N of the television signal is deteriorated considerably, the clamp is not adversely affected by noise, and at the same time the television signal is not damaged by the clamp pulse. In addition, during the period before pull-in at the time of throwing in power or switching the channels, the clamp feedback circuit is cut off, so that the second clamp circuit automatically functions to bias to a mean value, thereby preventing the signal potential from being disturbed unnecessarily. As a result, the detection of a sync signal is expedited, and after pull-in, the clamp is cancelled rapidly by the first clamp circuit.

The clamp system according to the present invention explained above with reference to FIG. 1 is a basic configuration, and in actual operation, there may be some response delay in switching the two clamp means by the switch 10. The reason for this and a second embodiment incorporating a preventive measure will be explained with reference to FIGS. 3 and 4.

(a) in FIG. 3 shows output waveforms of the two clamp circuits which are produced when the first clamp circuit is selected with average picture level of the television signal (hereinafter referred to as "APL") of 50%. The output of the first clamp circuit providing horizontal clamp is represented by the left side of the vertical line designated by 32, and the output of the second clamp circuit by the right side. A one-dot chain 33 designates a clamp level detection voltage and an APL voltage level, which coincide with each other in the present case. Numeral 34 designates a first clamp voltage, which is offset against the clamp level detection voltage 33. The right side of the vertical line 32 represents the output of the second clamp circuit biased by the clamp level detection voltage. When APL is 50% signal in this way, the DC potentials of the signals of the both circuits coincide with each other, thereby assuring smooth switching from the output of the first clamp circuit to that of the second clamp circuit. When APL is not 50% but, say, 80% as shown in (b) of FIG. 3, however, the DC potential of the output of the first clamp circuit is fixed like (a) regardless of APL in a manner similar to the left side of the vertical line 32. Nevertheless, the output of the second clamp circuit biased by a resistor at the position of APL as shown by the right side of vertical line 32 is reduced as a DC potential. If the switch is turned to the second clamp circuit output under this condition, the clamp level detection circuit detects the voltage of the detection level shown by 38 in (b) of FIG. 3, with the result that the feedback loop functions to return this voltage to 50% voltage by raising the second clamp control voltage. Since the time constant of the second clamp circuit is set to a large value for stabilization, however, it takes some time before an equilibrium is achieved, thereby causing a response delay.

Figure 4:
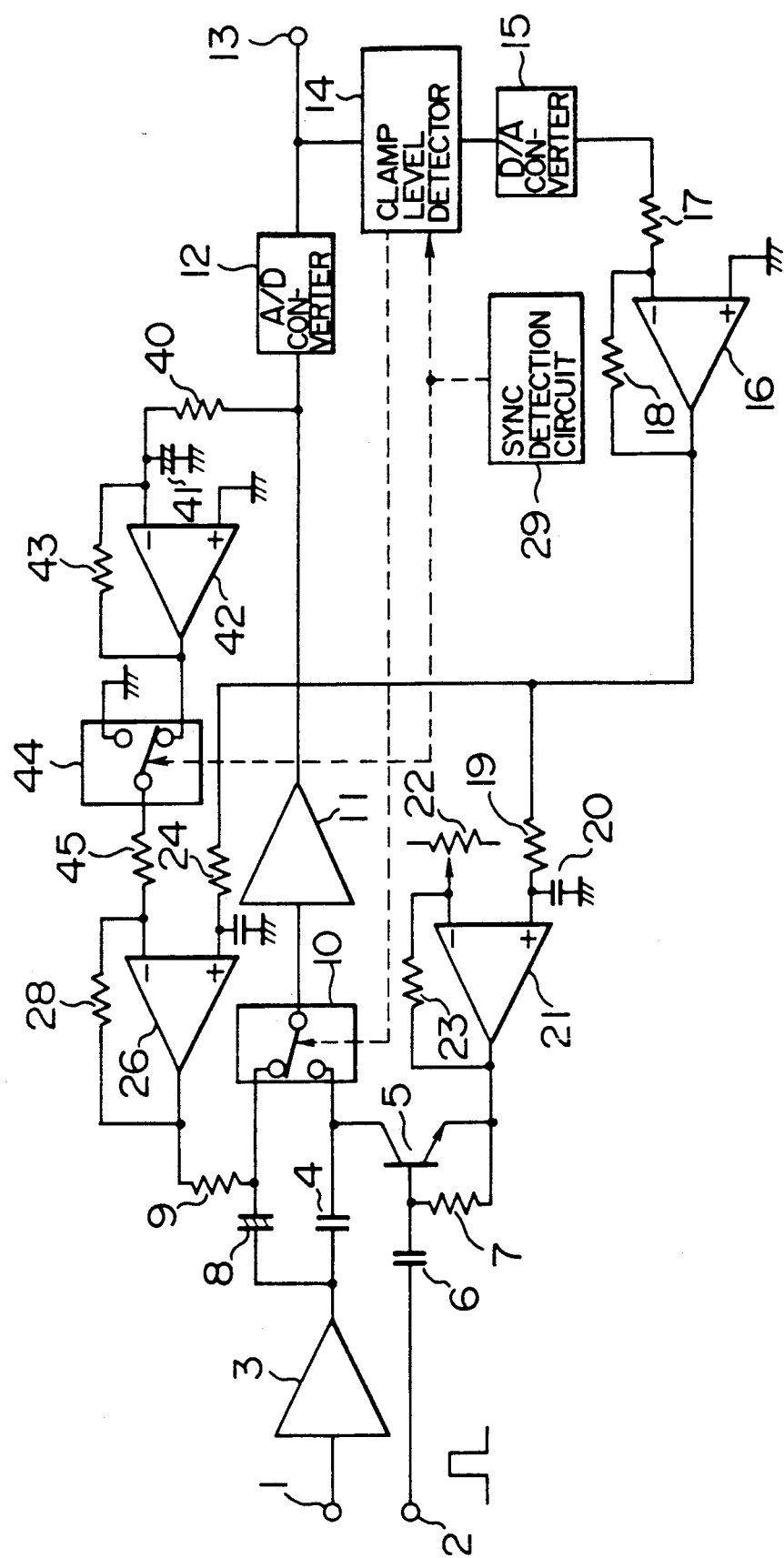
FIG. 4 is a circuit diagram of a television signal clamp apparatus according to a second embodiment of the present invention.

A second embodiment incorporating a preventive measure against this problem is shown in FIG. 4. In FIG. 4, the same basic circuit as in FIG. 1 is included, and those component elements which are identical to corresponding ones in FIG. 1 and designated with the same reference numerals will not be explained any more. In FIG. 4, numeral 40 designates a resistor with an end connected to the output of a buffer amplifier 11 for detecting the average DC potential of a clamped television signal. This resistor makes up an integration circuit with a capacitor 41, and an average DC potential obtained, that is, APL is subjected to inverted amplification at an operational amplifier 42. Numeral 43 designates a feedback resistor. The average DC potential obtained in this circuit is applied to one of the input terminals of a switch circuit 44, the other input terminal thereof being grounded. The switch 44 is controlled by a pull-in decision signal applied thereto from the sync detection circuit 29. The switch 44 is thus connected to the output side of the operational amplifier 42 in pull-in state, and to the earth side in pull-out state such as at the time of power thrown in or channel switching. The output of this switch 44 is applied through a resistor 45 to the inverted input terminal of the operational amplifier 26. In view of the fact that a clamp control voltage is applied to the non-inverted input terminal of the operational amplifier 26, it follows that the bias of the television signal of the second clamp circuit is controlled by the sum of the APL voltage of the clamped television signal and the clamp control voltage. The other parts of the operation are identical to those of the first embodiment explained with reference to FIG. 1. The operation from power throw-in will be explained. First, during the period before pull-in state, no accurate clamp pulse is produced, and therefore the second clamp circuit is selected by the switch 10. Meantime, the clamp level detection circuit produces a control voltage digitally fixed to 50% level regardless of the detection voltage, and the switch 44 is connected to the earth. As a result, the television signal of the second clamp circuit is merely biased by a fixed potential, that is, the central value of control voltage through the resistor 9. The television signal of the second clamp circuit is thus biased to average value and supplied to the A/D converter. During the period after pull-in to the start of clamp, the switch 10 turns to the first clamp circuit, and the switch 44 to the output of the operational amplifier 42, that is, the APL detection voltage. The associated operation of the second clamp circuit is explained above. After the clamp is started by the first clamp circuit and it is decided that the clamp level detection circuit 14 has entered a predetermined voltage range, the switch 10 returns to the second clamp circuit thereby to perform stable clamp operation. Under steady condition, the APL detection voltage of the second clamp circuit is controlled in such a manner as to compensate for the fluctuations of APL of the video signal, thereby achieving a further stable operation.

Figure 5:
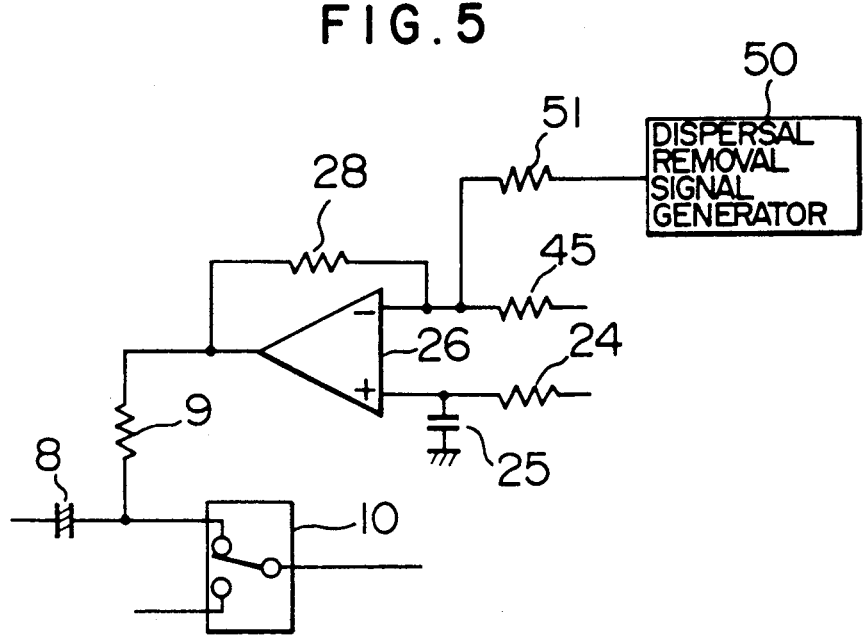
FIG. 5 is a circuit diagram of a television signal clamp apparatus according to a third embodiment of the present invention.
Figure 6:
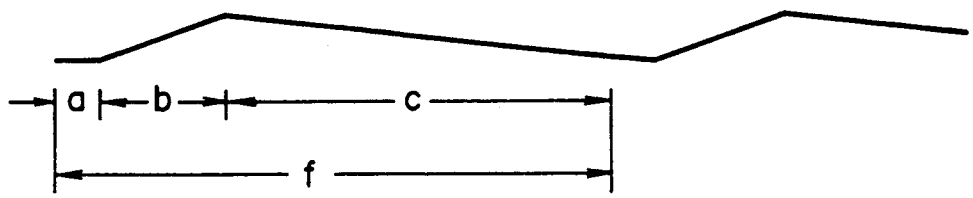
FIG. 6 is a diagram showing a waveform of a dispersal signal.

In a television broadcast using an earth satellite, an energy diffusion signal called a dispersal signal is generally superimposed to prevent the broadcasting FM wave from hampering the ground communications system. In the case of the television signal of MUSE system, the dispersal signal takes the form as shown in FIG. 6 including a horizontal sync signal period a, a color difference signal period b, a luminance signal period c and a 1H period f. A dispersal signal such as this of MUSE system in which 1H period represents a cycle cannot be removed by horizontal clamp, and therefore is offset by adding a dispersal removal signal completely in opposite form to the television signal. This addition is easily effected by use of the second clamp circuit according to the present invention. An example of this function will be explained with a third embodiment shown in FIG. 5. FIG. 5 illustrates a part extracted from the second embodiment, in which identical component elements are denoted by the same reference numerals and will not be explained further. Numeral 50 designates a dispersal removal signal generator, and numeral 51 a resistor for adding the dispersal removal signal to an average DC potential detection voltage of an inverted input of the operational amplifier 26. The dispersal removal signal, should originally be a signal with a polarity inverted from the signal of FIG. 6, has the same polarity in this embodiment in which it is applied to the inverted input of the operational amplifier.

The manner in which a dispersal removal signal is applied is not limited to the form shown in FIG. 5, but it may of course be applied in any form as long as it is applied to the control voltage of the second clamp circuit.

It will thus be understood from the foregoing description that according to the present invention the clamp is prevented from being disturbed by noises at the time of S/N deterioration is horizontal clamp without increasing the time constant of clamp to meet a sharp fluctuation in DC potential, and the problem of vertical clamp with strong noises but slow response is solved. Further, a dispersal removal signal is added easily.

We claim:

1. A television signal clamp system comprising: a first clamp means for clamping an input television signal once every N horizontal blanking periods by a clamp pulse to a an externally supplied clamp control voltage to provide a first clamped television signal output, N being a positive integer of one or more, a second clamp means for controlling a DC potential of said input television signal by adding an externally applied clamp control voltage to the input television signal to provide a second clamped television signal output, a switch means for selecting one of said first clamp means and said second clamp means, a clamp level detection means for detecting a DC potential of a reference potential signal period existing in one of said first clamped television signal output and said second clamped television signal output of said first clamp means and said second clamp means selected by said switch means and a control voltage production means, cooperating with said clamp level detection means, for producing said clamp control voltages for the first clamp means and said second clamp means, wherein said switch means selects the first clamp means at a time of throwing in power and switching channels when prompt clamp start is required, and said switch means selects the second clamp means under normal conditions.

2. A television signal clamp system according to claim 1, wherein said clamp level detection means detects an average DC voltage of a said clamped television signal and adds said average DC voltage to a said control voltage produced from the clamp level detection means to provide a said clamp control voltage for the second clamp means.

3. A television signal clamp system according to claim 1, wherein said control voltage production means comprises offset means for producing, responsive to a difference between a DC potential during a reference potential signal period for detecting a clamp level in the television signal and a DC potential of a signal during a clamp period of the first clamp means a control voltage for said first clamp means which is offset by an amount corresponding to said difference.

4. A television signal clamp system according to claim 1, wherein said control voltage production means comprises means for fixing the clamp control voltages to a constant value until the television receiver achieves a pull-in state and the output of the second clamp means is supplied to subsequent stages without adding the average DC voltage thereto.

5. A television signal clamp system according to claim 1, wherein said control voltage production means comprises means for superimposing a dispersal removal signal on the clamp control voltage for the second clamp means.

6. A television signal clamp system according to claim 1, wherein said switch means selects the first clamp means when the detection level of the clamp level detection means is not within a predetermined range and selects the second clamp means when the detection level is within said predetermined range.

7. A television signal clamp system comprising: means comprising first clamp means for clamping an input television signal once every N horizontal blanking periods by a clamp pulse to an externally supplied clamp control voltage to provide a first clamped television signal output, N being a positive integer of one or more, a second clamp means for controlling a DC potential of said input television signal by adding an externally applied control voltage to the input television signal to provide a second clamped television signal output, and a switch means for selecting one of said first clamp means and said second clamp means, a clamp level detection means for detecting a DC potential of a reference potential signal period existing in one of said first clamped television signal output and said second clamped television signal output of said first clamp means and said second clamp means selected by said switch means and a control voltage production means, cooperating with said clamp level detection means, for generating said clamp control voltages for the first clamp means and said second clamp means, wherein said switch means selects the first clamp means at a time of throwing in power and switching channels when prompt clamp start is required and said switch means selects the second clamp means under normal conditions, the clamp system further comprising means for detecting and adding an average DC voltage of the clamped television signal to a control voltage produced from the control voltage production means thereby to provide a control voltage for the second clamp means, and means for superimposing a dispersal removal signal on the control voltage for the second clamp means.

* * * * *